United States Patent
Larimore et al.

(10) Patent No.: US 9,708,991 B2
(45) Date of Patent: Jul. 18, 2017

(54) REAL-TIME RESIDUAL MASS ESTIMATION WITH ADAPTIVE SCALING

(71) Applicant: Robert Bosch GmbH, Stuttgart (DE)

(72) Inventors: Jacob Larimore, Ann Arbor, MI (US); Li Jiang, Ann Arbor, MI (US); Erik Hellstrom, Ann Arbor, MI (US); Shyam Jade, Ann Arbor, MI (US); Anna Stefanopoulou, Ann Arbor, MI (US); Julien Vanier, Farmington Hills, MI (US)

(73) Assignees: Robert Bosch GmbH, Stuttgart (DE); The Regents of the University of Michigan, Ann Arbor, MI (US)

( * ) Notice: Subject to any disclaimer, the term of this patent is extended or adjusted under 35 U.S.C. 154(b) by 821 days.

(21) Appl. No.: 14/185,673

(22) Filed: Feb. 20, 2014

(65) Prior Publication Data
US 2014/0230780 A1    Aug. 21, 2014

Related U.S. Application Data

(60) Provisional application No. 61/766,754, filed on Feb. 20, 2013.

(51) Int. Cl.
| | |
|---|---|
| *F02D 41/00* | (2006.01) |
| *G01M 15/04* | (2006.01) |
| *F02D 35/02* | (2006.01) |

(52) U.S. Cl.
CPC ....... *F02D 41/0062* (2013.01); *F02D 35/028* (2013.01); *G01M 15/042* (2013.01); *Y02T 10/128* (2013.01); *Y02T 10/47* (2013.01)

(58) Field of Classification Search
CPC . F02D 41/0062; F02D 35/028; G01M 15/042
(Continued)

(56) References Cited

U.S. PATENT DOCUMENTS

| 6,212,467 B1 | 4/2001 | Guzella et al. |
| 6,550,451 B1 * | 4/2003 | Muller ............... F02D 41/0062 |
| | | 123/406.45 |

(Continued)

FOREIGN PATENT DOCUMENTS

| DE | 10254475 | 4/2004 |
| DE | 102006000973 | 7/2007 |

(Continued)

OTHER PUBLICATIONS

International Search Report from the International Searching Authority for Application No. PCT/US2014/017461 dated May 16, 2014 (5 pages).

(Continued)

*Primary Examiner* — Mahmoud Gimie
(74) *Attorney, Agent, or Firm* — Michael Best & Friedrich LLP

(57) ABSTRACT

Systems and methods are described for on-line, real-time estimation of a residual mass in an engine cylinder during HCCI combustion. The residual mass is estimated based on an estimated residual mass for a previous combustion cycle. A value of a first performance variable for the first combustion cycle is determined based only on engine data measured by one or more sensors. A value of a second performance is estimated based at least in part on the estimated residual mass for the first combustion cycle. An adaptive scaling factor is determining for the first combustion cycle based on the determined value of the first performance variable and the estimated value of the second performance variable. An adjusted residual mass for the first combustion cycle is then determined based on the estimated residual mass for the first combustion cycle and the adaptive scaling factor for the first combustion cycle.

20 Claims, 5 Drawing Sheets

(58) Field of Classification Search
USPC .............................. 123/319, 568.14; 701/108
See application file for complete search history.

(56) References Cited

U.S. PATENT DOCUMENTS

| | | |
|---|---|---|
| 6,827,051 B2 | 12/2004 | Kawasaki et al. |
| 7,685,871 B2 | 3/2010 | Sinnamon |
| 7,739,999 B2 | 6/2010 | Kang et al. |
| 7,894,976 B2 | 2/2011 | Yun et al. |
| 8,099,230 B2 | 1/2012 | Wermuth et al. |
| 8,165,779 B2 | 4/2012 | Ostberg et al. |
| 2003/0105575 A1 | 6/2003 | Haskara et al. |
| 2004/0139949 A1 | 7/2004 | Koseki et al. |
| 2004/0220718 A1* | 11/2004 | Uchida ............... F02D 13/0219 701/108 |
| 2005/0229909 A1* | 10/2005 | Nakazawa .......... F02D 13/0261 123/568.14 |
| 2011/0270505 A1 | 11/2011 | Chaturvedi et al. |
| 2012/0042850 A1 | 2/2012 | Haskara et al. |
| 2013/0054117 A1 | 2/2013 | Loeffler et al. |
| 2013/0125544 A1 | 5/2013 | Mond et al. |

FOREIGN PATENT DOCUMENTS

| | | |
|---|---|---|
| DE | 102009000149 | 7/2010 |
| DE | 102012203876 | 10/2012 |
| EP | 1213466 | 6/2002 |

OTHER PUBLICATIONS

Written Opinion of the International Searching Authority for Application No. PCT/US2014/017461 dated May 16, 2014 (5 pages).

\* cited by examiner

REAL-TIME RESIDUAL MASS ESTIMATION WITH ADAPTIVE SCALING

RELATED APPLICATIONS

This application claims the benefit of U.S. Provisional Patent Application No. 61/766,754, filed Feb. 20, 2014, entitled "DEVICE AND METHOD FOR REAL-TIME RESIDUAL GAS ESTIMATION," the entire contents of which are incorporated herein by reference.

BACKGROUND

The present invention relates to systems and methods for estimating engine performance characteristics and using the estimated performance characteristics to control engine operation. In particular, the present invention relates to systems and methods for estimating a residual gas fraction during recompression homogeneous charge compression ignition (HCCI) combustion.

SUMMARY

Recompression homogeneous charge compression ignition (HCCI) is a combustion strategy that can potentially achieve high thermal efficiency with low engine-out emissions. HCCI involves compression-driven, near-simultaneous auto-ignition events at multiple sites throughout a homogeneous mixture within an engine cylinder. Auto-ignition timing control in HCCI combustion requires careful regulation of the temperature, pressure, and composition of the pre-combustion cylinder charge. This regulation of charge properties is carried out in recompression HCCI by retaining a large fraction of the post-combustion residual gases before they can be exhausted.

Since the temperature and mass of the trapped residuals cannot be measured directly, model-based control strategies are implemented that can be run in real-time on embedded control hardware. The ability to accurately predict combustion phasing is important when used in these model-based predictive control strategies because the phasing and timing of HCCI combustion must be maintained within a narrow acceptable range to satisfy stability and mechanical constraints.

Furthermore, accurate modeling of the residual gas fraction is important for a control oriented model due to HCCI's high sensitivity to the thermal energy associated with the residual mass (i.e., the amount of gasoline remaining in the engine cylinder at the end of a combustion cycle). HCCI combustion is heavily dependent on the thermodynamic state of the cylinder charge at the time of intake valve closing and recompression HCCI combustion dynamics specifically are driven by the recycled thermal energy of the trapped residual mass. If too much residual mass is trapped, the combustion can occur very early in the cycle causing potential engine damage and a loss in efficiency. If too little mass is trapped, the combustion can become highly oscillatory and misfires may occur. However, the residual mass trapped by the early exhaust valve closing cannot be measured directly and previous model-based attempts to estimate the trapped residual mass utilize offline analysis techniques which may require a steady-state assumption.

The systems and methods described herein are capable of on-line, real-time estimation of the residual mass and, based on the estimated residual mass, estimation of the residual gas fraction. In one embodiment, the invention provides a method of estimating a residual mass in a cylinder after a combustion cycle. An estimated residual mass for a first combustion cycle is determined based on an estimated residual mass for a previous combustion cycle. A value of a first performance variable for the first combustion cycle is determined based only on engine data measured by one or more sensors. A value of a second performance is estimated based at least in part on the estimated residual mass for the first combustion cycle. An adaptive scaling factor is determining for the first combustion cycle based on the determined value of the first performance variable and the estimated value of the second performance variable. An adjusted residual mass for the first combustion cycle is then determined based on the estimated residual mass for the first combustion cycle and the adaptive scaling factor for the first combustion cycle.

In another embodiment the invention provides a method of controlling homogeneous charge compression ignition (HCCI) in an engine. An estimated residual mass for a combustion cycle is determined based on measured engine parameters and an estimated residual mass for a previous combustion cycle. The estimated residual mass includes an estimated amount of fuel remaining in an engine cylinder at an end of the combustion cycle. A first temperature value for the cylinder is determined based only on a calculated combustion phasing for the combustion cycle which, in turn, is based on cylinder pressure data directly measured during the combustion cycle. A second temperature value for the cylinder is estimated based on the estimated residual mass for the combustion cycle. An adaptive scaling factor is determined based at least in part on a discrepancy between the first temperature value and the second temperature value. As a result, the adaptive scaling factor is indicative of an error of the estimated residual mass for the combustion cycle. An estimated residual gas fraction is determined based on the estimated residual mass and then adjusted by multiplication with the adaptive scaling factor. At least one engine control variable is then controlled during a subsequent combustion cycle based on the adjusted residual gas fraction. The at least one engine control variable includes at least one engine control variable selected from the group consisting of timing of intake valve opening, timing of intake valve closing, timing of exhaust valve opening, timing of exhaust valve closing, timing of fuel injection, and mass of fuel injected.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
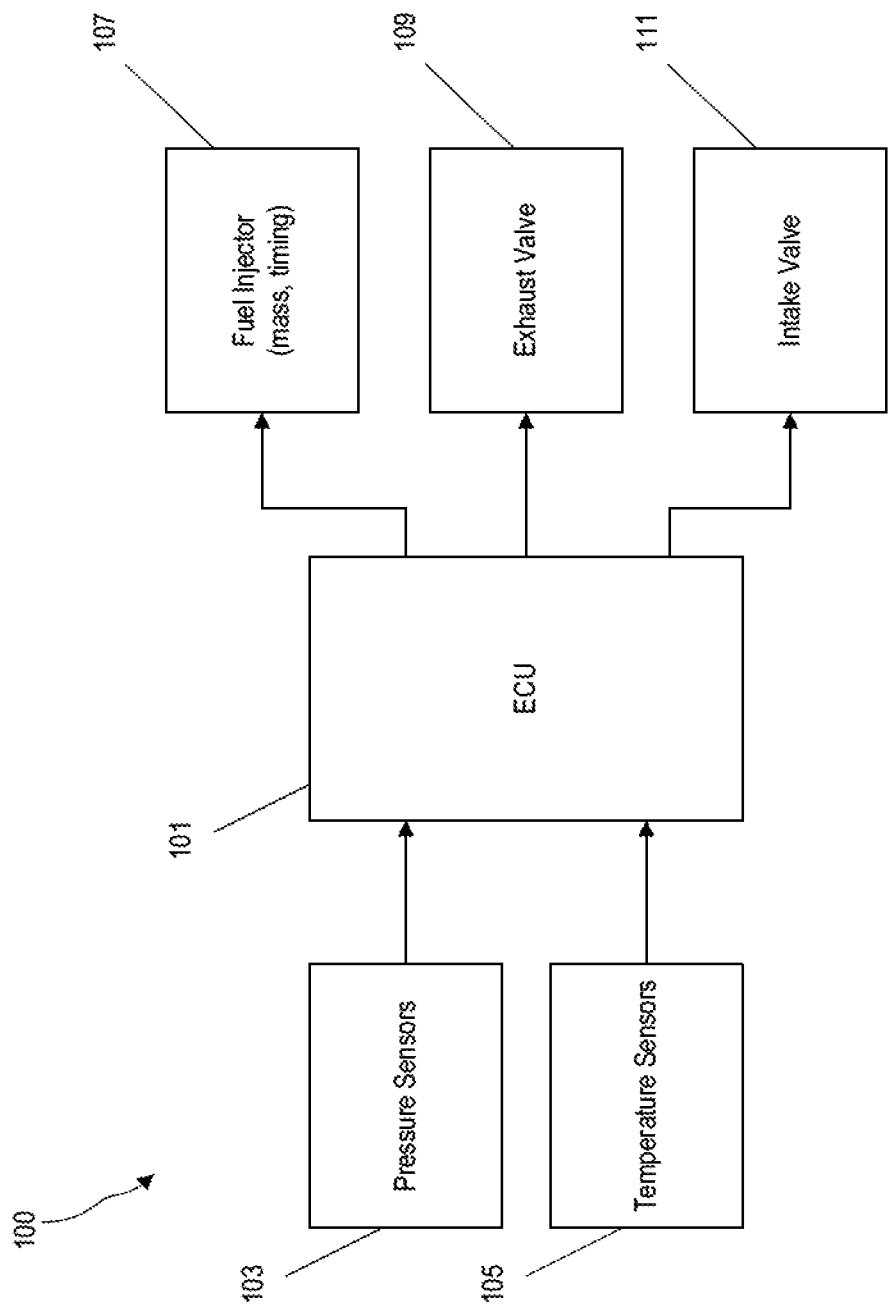
FIG. 1 is a block-diagram of an engine control system according to one embodiment.

FIG. 1 illustrates an example of an engine control system 100. An engine control unit (ECU) 101 receives input values from a number of sensor positioned on and around the engine of the vehicle. These sensor include a plurality of pressure sensors 103 configured to measure, among other things, the pressures within individual cylinders of the engine and the intake/exhaust pressures. Temperature sensors 105 measure, for example, the temperature of the intake air to each engine cylinder and the exhaust air from each cylinder.

The ECU 101 analyzes the sensors readings and controls various engine actuators accordingly in order to achieve HCCI combustion. These engine actuators include the fuel injectors 107 by which the ECU 101 can control the amount (i.e., "mass") of fuel injected into a cylinder during each combustion cycle and the timing of the injection. The ECU 101 also controls the opening and closing timing of an exhaust valve 109 and an intake valve 111 for each cylinder.

Although FIG. 1 only illustrates a single fuel injector 107, exhaust valve 109, and intake valve 111, it is to be understood that combustion engines may include multiple engine cylinders and, as such, may also include one fuel injector, exhaust valve, and intake valve for each cylinder. Alternatively, in some constructions, certain component might be shared by multiple cylinders. Similarly, the exact number and position of engine sensors that provide information to the ECU 101 can vary in different constructions.

The ECU 101 can be implemented in a number of different ways—as will be apparent to those skilled in the art. For example, the ECU 101 may include non-transient memory storing instructions and a processor capable of executing the stored instructions to control the operation of the ECU 101. Alternatively (or in addition), the ECU 101 may include one or more application-specific integrated circuits (ASICs) configured to control the operation of the ECU 101 as described herein.

Figure 2:
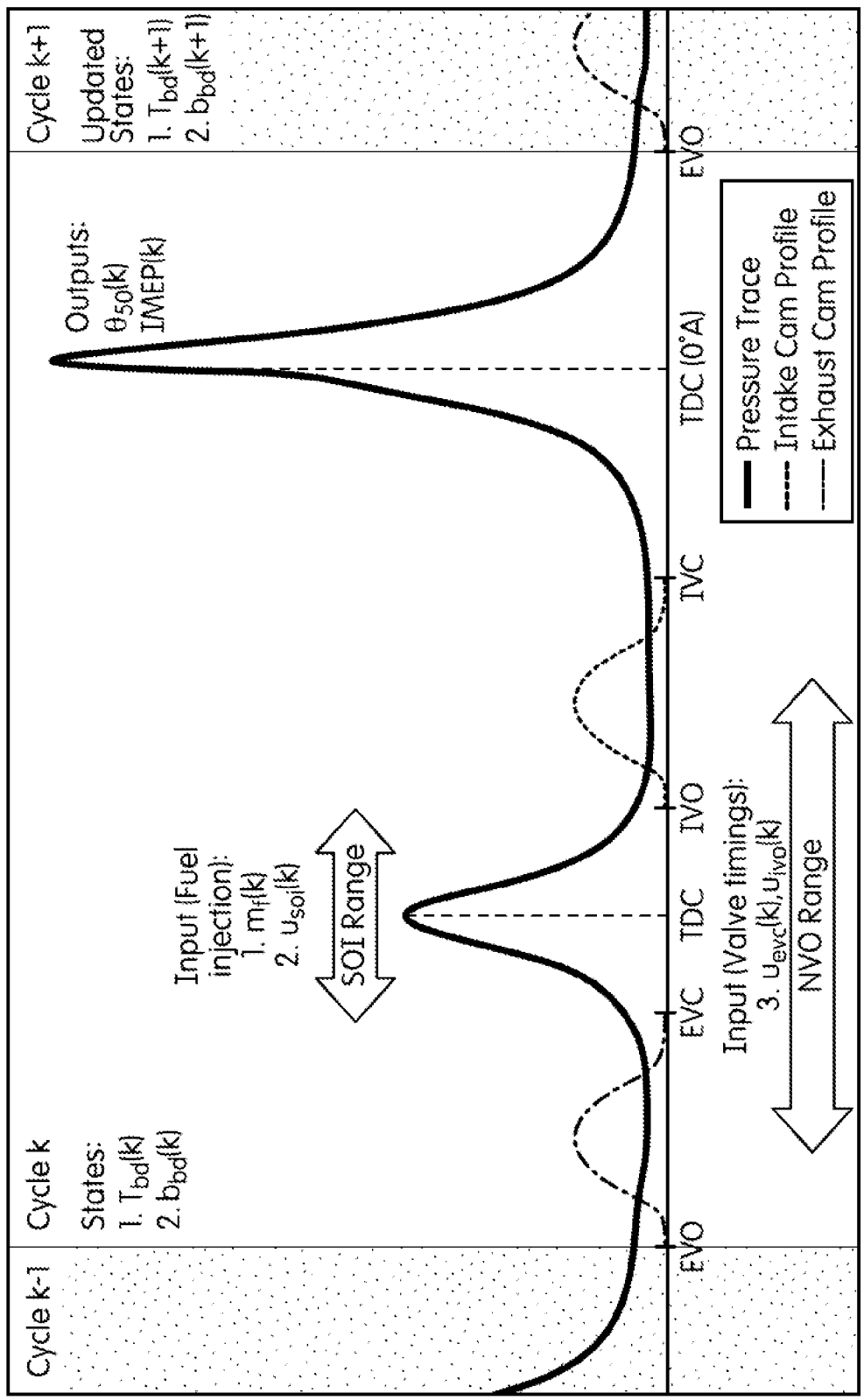
FIG. 2 is a graph of cylinder pressures and valve timing during a HCCI combustion cycle in an engine.

FIG. 2 illustrates the operation of the engine during HCCI combustion in terms of the pressures exhibited in a single cylinder throughout a single combustion cycle and the corresponding valve and fuel injection timing required to achieve proper combustion and auto-ignition. The present combustion cycle is denoted at "Cycle k." The graph also illustrates a portion of the cylinder pressures and valve timings from the previous combustion cycle ("Cycle k−1") and the subsequent combustion cycle ("Cycle k+1").

During the combustion cycle ("Cycle k"), the exhaust valve 109 is opened at EVO allowing exhaust gases to escape from the cylinder and the valve is again closed at EVC. Fuel is injected at some point after the exhaust valve is closed (EVC). After fuel is injected, the air intake valve 111 is opened (at IVO) to allow fresh air to enter the cylinder. After the intake vale 111 is closed (at IVC), pressure within the cylinder increases—due in part to movement of the piston within the cylinder. Ultimately, this increase in pressure causes combustion of the injected fuel and corresponding movement of the piston. As noted above, the exact timing of the fuel injection and the valve closing can be controlled and adjusted by the ECU 101.

The model implemented by the ECU 101 and as described in detail below is based on a two-state control strategy. An additional state based on the estimated residual fuel mass is also incorporated as well as a parametric model for adaptive parameter estimation.

The two dynamic states used to capture cycle-to-cycle interactions include: (1)

(1) $T_{bd}$: The temperature of the blowdown gases, which is used to represent the recycled thermal energy.; and (2) $b_{bd}$: The burned gas fraction of the blowdown process, which represents the composition dynamics.

The blowdown process is a rapid expansion of exhaust gases during the exhaust stroke where the pressures of the cylinder and exhaust system equalize quickly. For the purposes of this model, the states are defined immediately after the blowdown process as:

$$T_{bd}(k) = T_{ivc}(k-1)\left(\frac{p_{ivc}(k-1)}{p_{em}}\right)^{\frac{1-n}{n}}\left[1 + \frac{\eta_m(k-1)q_{lhv}RV_{50}^{n-1}}{c_v p_{ivc} V_{ivc}^n}m_f(k-1)\right]^{\frac{1}{n}} \quad (1)$$

$$b_{bd}(k) = \frac{(AFR_s + 1)m_f(k-1)}{m_c(k-1)} + \ominus \hat{x}_r(k-1)b_{bd}(k-1). \quad (2)$$

where $T_{evo}$ is the temperature at exhaust valve opening, $T_{ivc}$ is the temperature at intake valve closing, $p_{evo}$ is the pressure at exhaust valve opening, $p_{ivc}$ is the pressure at intake valve closing, $p_{em}$ is the pressure at exhaust valve closing, $\eta_{im}$ is the combustion efficiency, $q_{lhv}$ is the heating value of the fuel, R is the gas constant for a given composition, $V_{ivc}$ is the volume of the cylinder at intake valve closing, $V_{50}$ is the volume of the cylinder at 50% burn, $c_v$ is the specific heat for a given composition, $m_f$ is the total in-cylinder fuel mass, $AFR_s$ is the stoichiometric air-fuel ratio, and $m_c$ is the total charge mass including a sum of the mass of fuel, mass of air, and the mass of other residuals at the time of intake valve closing. $\hat{x}_r$ is the adjusted residual gas fraction estimate for the previous combustion cycle (i.e., cycle k−1) and the variable $\Theta$ is an adaptable scaling factor which are both described in further detail below The model has three primary inputs (i.e., variables that can be controlled by the ECU 101): the mass of fuel injected ($m_f$), the injection timing ($u_{soi}$), and the timing of exhaust valve closing ($u_{evc}$). The EVC timing controls the amount of negative valve overlap (NVO), the crankangle difference between EVC and IVO, with which the engine operates. This has a direct impact on the charge composition and temperature. The model has two outputs: the combustion phasing of 50% burn ($\theta_{50}$) and the engine torque (IMEP). The mass of fuel injected is directly proportional to the engine torque. Therefore, this model characterizes the combustion cycles of FIG. 1 as a three-input, two output system.

To increase the fidelity and accuracy of the two-state model described above, an additional state is also considered—the trapped residual mass ($m_{res}$). The hot residual mass trapped in recompression HCCI comprises a significant portion of the charge and, consequently, the thermal energy of the combustion cycle. Since the dynamics of combustion are heavily dependent on the thermal energy, accurate prediction of the residual mass improves the ability of the ECU 101 to accurately control the combustion cycle.

This third state is derived by studying the amount of heat lost per unit mass (q) through the total change in internal energy during the exhaust process (i.e, EVO through EVC). The process is split into two segments of equal time defined by:

$$q_1 = \int_{T_{evo}}^{T_{ref}} c_p \, dT - R \int_{P_{evo}}^{P_{ref}} \frac{T}{P} dP \qquad (3)$$

$$q_2 = \int_{T_{ref}}^{T_{evo}} c_p \, dT - R \int_{P_{ref}}^{P_{evo}} \frac{T}{P} dP. \qquad (4)$$

where "ref" is the dividing point in crankangle space and is defined as the average of EVO and EVC.

The ratio of the heat loses are then defined as:

$$r_{ex} \equiv \frac{q_1}{q_2} \geq 1. \qquad (5)$$

Because most of the heat—and, therefore, mass—is lost during the first part of the exhaust process (known as blowdown), the value of this ratio should be greater than one is most instances. The true value of this ratio is unknown; however, based on sensitivity analysis, the value of this variable has small effect on the residual mass estimate described below. Therefore, for the purposes of this model, the value of the ratio is assume to be exactly equal to one for mathematical simplicity.

Equations (3) and (4) are substituted into equation (5) and the integrals are approximated to derive the following equation:

$$c_p(T_{ref} - T_{evo}) - R\left(\frac{T_{ref} + T_{evo}}{2}\right)\ln\left(\frac{P_{ref}}{P_{evo}}\right) = $$
$$c_p(T_{evc} - T_{ref}) - R\left(\frac{T_{evc} + T_{ref}}{2}\right)\ln\left(\frac{P_{evc}}{P_{ref}}\right)$$

Algebraic simplification of this equation yields:

$$\gamma T_{evo} + \zeta T_{evc} = T_{ex}\left\{-2c_p + \frac{R}{2}\ln\left(\frac{P_{ref}^2}{P_{evo}P_{evc}}\right)\right\} \qquad (6)$$

where $\gamma = -c_p - R/2*\ln(P_{ref}/P_{evo})$ and $\zeta = -c_p + R/2*\ln/P_{evc}/P_{ref})$.

Equation (6) has two unknowns—$T_{evo}$ and $T_{evc}$—as well as other variables which are either known or can be measured. The value of $T_{ex}$ is the exhaust gas temperature inside the cylinder during the exhaust process and cannot be measured directly. However, this time-varying parameter is close to the value of the state $T_{bd}$ and is approximated as being equal thereto for the purposes of this model. This discrepancy is accounted for by the adaptive parameter described below.

The other unknown temperatures—$T_{evo}$ and $T_{evc}$—and the corresponding masses can be defined according to the ideal gas law as:

$$T_{evo} = \frac{P_{evo}V_{evo}}{m_{evo}R}, \qquad (7)$$

$$T_{evc} = \frac{P_{evc}V_{evc}}{m_{evc}R},$$

$$m_{evo} = m_{in}(k) + m_{res}(k),$$

$$m_{evc} = m_{res}(k+1)$$

Substituting these expressions into Equation (6) provides one equation defined in terms of $m_{res}(k)$ and $m_{res}(k+1)$:

$$\gamma \frac{P_{evo}V_{evo}}{(m_{in}(k) + m_{res}(k))R} + \zeta \frac{P_{evc}V_{evc}}{m_{res}(k+1)R} = T_{bd}\left\{-2c_p + \frac{R}{n}\ln\left(\frac{P_{ref}^2}{P_{evo}P_{evc}}\right)\right\} \qquad (8)$$

Equation (8) can be simplified by grouping terms and lumping constant coefficients as:

$$m_{res}(k+1) = \frac{\alpha(k) + \beta(k)m_{res}(k)}{A(k) + m_{res}(k)} \qquad (9)$$

where $\alpha(k)$, $\beta(k)$, and $A(k)$ are functions of the constants R and $c_p$, known inputs, and measured values; namely the in-cylinder pressure at specific times during the combustion cycle ($P_{cyl,evo}$, $P_{cyl,evc}$, and $P_{cyl,ref}$) and the mass of fresh air drawn into the cylinder for each cycle.

By defining the masses as in (7), residual mass no longer must be assumed to be a steady-state variable. Furthermore, by defining the masses of such, equation (9) is only dependent on known or measurable values. The resulting equation is computationally straightforward and can be implemented by the ECU 101 online such that calculations are made in real-time.

Figure 3:
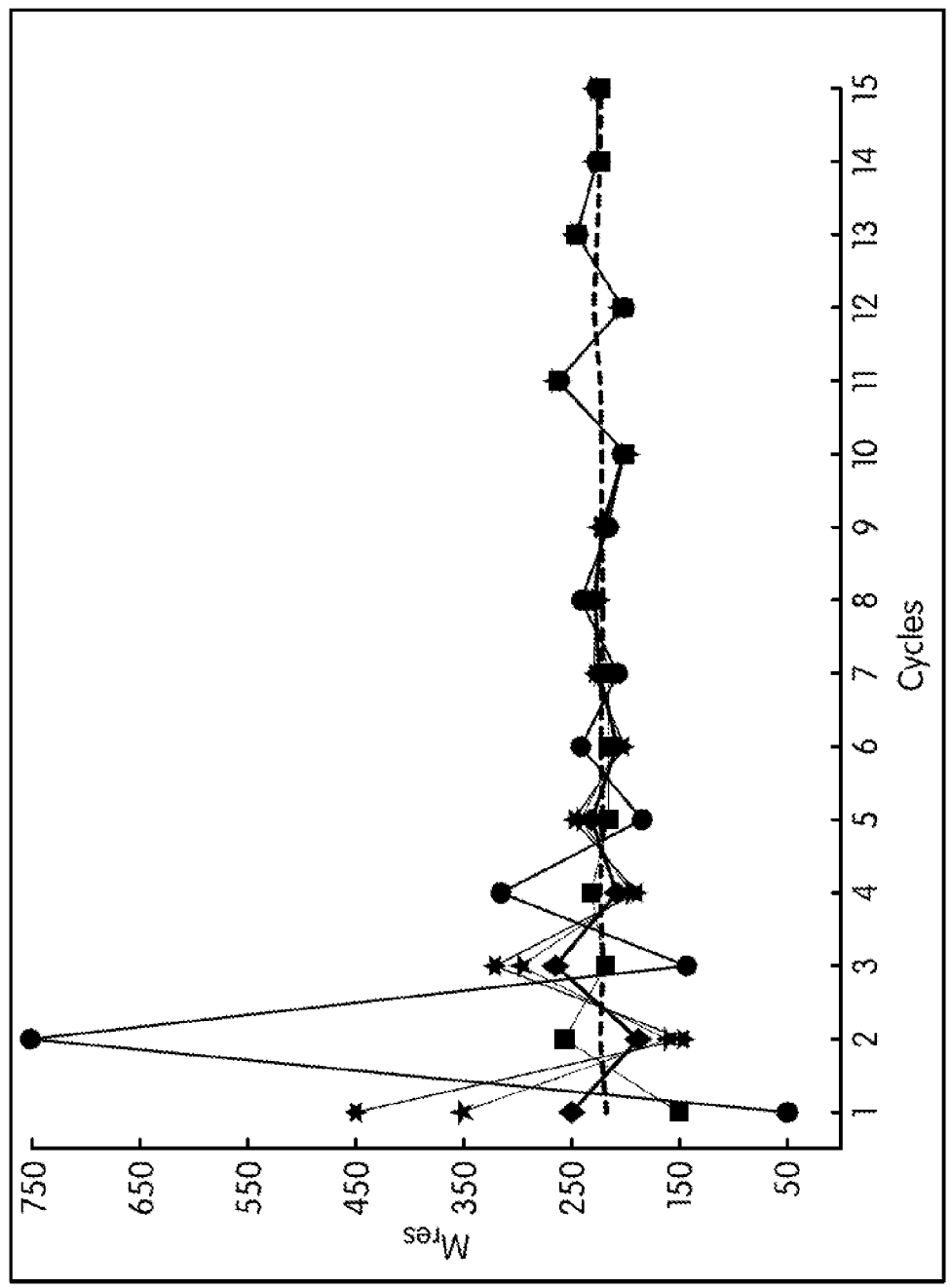
FIG. 3 is a graph illustrating the convergence of the predicted residual mass over a number of combustion cycles.

The result found in equation (9) predicts the amount of residual mass in cycle k+1 based on previous measured data and the value of the residual mass in the previous cycle ("Cycle k"). Therefore, the only unknown is the initial estimate of $m_{res}$. However, the equation is self-correcting in that, for a positive initial estimation, the difference equation will converge to a stable, fixed-point equilibrium for a give operating condition. FIG. 3 illustrates this convergence with several different arbitrarily selected starting values for $m_{res}$.

To summarize, the model described above and augmented with the third state (i.e., $m_{res}$) can be defined as:

$$T_{bd}(k+1) = f_1(T_{bd}(k), x_r(k), m_f(k), T_{im}, P_{im}, P_{exh}, V, c_v) \qquad (10)$$

$$b_{bd}(k+1) = f_2(T_{bd}(k), x_r(k), m_f(k), b_{bd}(k))$$

$$m_{res}(k+1) = f_3(T_{bd}(k), m_{res}(k), P_{cyl}, V)$$

where $$x_r(k) = \frac{m_{res}(k)}{m_{total}(k)}$$

where the values for $T_{im}$, $P_{int}$, $T_{ex}$, and $P_{exh}$ are the measured intake and exhaust temperatures as measured by sensors 103, 105. The value $x_r(k)$ is the residual gas fraction.

As noted above, the value of $T_{ex}$ is not directly measured, but, rather, is approximated as being equal to the blowdown temperature $T_{bd}$. This discrepancy is accounted for by applying an adaptive correcting scaling factor. Similarly, other temperature and pressure measurements might be approximated based on similar measured temperatures and also corrected by applying an adaptive scaling factor as described below.

As also noted above, the only direct measurement obtained of the combustion occurring within the engine cylinder is the in-cylinder pressure. From these measured pressures throughout the course of the combustion cycle, combustion phasing can be determined. In the model described above, combustion phasing is most directly influenced by the temperature of the charge at the time of intake valve closing (i.e., $T_{ivc}$). If the model of intake temperature is defined to include an adaptive parameter $\Theta$, then a linear parametric model for parameter estimation can be derived from the non-linear model of $T_{ivc}$.

Once derived, the adaptive parameter $\Theta$ is used as a scaling factor, such that $\hat{x}_f = \Theta x_r$, to correct the estimated value of the residual gas fraction and to account for assumptions made in the model above. Described below are two methods for calculating an adaptive scaling factor. To distinguish between these two methods, the adaptive scaling factor calculated according to the first method is referred to below as $C_e$, while the adaptive scaling factor calculated according to the second method is referred to as $\Theta$. References to the adaptive scaling factor $\Theta$ above should generally be read as referring an adaptive scaling factor calculated according to either method below or other methods.

In the first example, the model of intake temperature including the adaptive parameter $C_e$ is represented according to the equation:

$$T_{ivc}(k+1) = \hat{x}_r(k) T_{res}(k) + (1 - \hat{x}_r(k)) T_{im}, \quad (11)$$

and, to reflect this change, the model in its functional form is represented as:

$$T_{bd}(k+1) = \hat{f}_1(T_{bd}(k), \hat{x}_r(k), m_f(k), T_{im}, P_{im}, P_{esh}, V, c_r)$$

$$b_{bd}(k+1) = \hat{f}_2(T_{bd}(k), \hat{x}_r(k), m_f(k), b_{bd}(k))$$

$$m_{res}(k+1) = f_3(T_{bd}(k), m_{res}(k), P_{es}, V) \quad (12)$$

In Equation (11), the value of $T_{res}$ (i.e., the temperature of the residual mass after combustion) is defined as a linear function of the state $T_{bd}$. As such, this value is readily available in the model and is determined, based in part, on the adjusted residual gas fraction $\hat{x}_r$ (as are the other variables in equation (11)). By distributing terms, Equation (11) can be represented in the form of a normal linear parametric model (i.e., $z = \Theta^* \phi$) as:

$$z = \frac{T_{ivc} - T_{im}}{T_{res} - T_{im}},$$

$$\theta^* = C_e$$

and $$\phi = x_r.$$

where $T_{im}$ is the measured intake manifold temperature.

Because $T_{ivc}$ is unknown and to form an error term, an estimate of $T_{ivc}$ is derived from measurements. Determination of any in-cylinder temperature at a specific crankangle in real-time is difficult to do accurately using sensors. However, combustion phasing can be estimated with a high level of certainty based on measured cylinder pressures. Using the formulation of the Arrhenius Integral of the model, the model described above can be inverted to find the value of $T_{ivc}$ which would have been necessary to achieve the estimated combustion phasing on the previous cycle. The Arrhenius Integral is represented as:

$$1 + K_{soi} u_{soi} = \int_{ivc}^{\theta_{50}} \frac{A}{\omega} P_c^{n_p} \exp\left(\frac{B}{T_c}\right) d\theta \quad (13)$$

For the desired operating range of HCCI combustion, this equation can be well approximated by a quadratic whose coefficients vary as linear functions of injection timing:

$$\theta_{50} = a T_{ivc}^2 + b T_{ivc} + c \quad (14)$$

By inverting this equation, an estimated value of $T_{ivc}$ can be determined from the calculated phasing (denoted as $\Theta_{50,e}$):

$$T_{ivc,e} = \frac{-b - \sqrt{b^2 - 4a(c - \theta_{50,e})}}{2a} \quad (15)$$

The value z becomes:

$$z = \frac{T_{ivc,e} - T_{im}}{T_{res} - T_{im}}. \quad (16)$$

The adaptive scaling parameter $C_e$ can then be determined based on least-squares formula with a forgetting factor according to the following equation:

$$C_e(n) = \left(\sum_{i=1}^{n} \phi(i) \lambda^{(n-i)} \phi(i)^T\right)^{-1} \left(\sum_{i=1}^{n} \phi(i) \lambda^{(n-i)} z(i)\right) \quad (17)$$

The value of $\lambda$ controls the degree to which values from previous combustion cycles influence the calculation of the adaptive scaling parameter $C_e$. When $\lambda=1$, this equation is a pure least-squares algorithm. As $\lambda$ is decreased, there is more discounting of previous values, but an increase in sensitivity to noise. To allow the adaptive scaling parameter to change with operating conditions, it is necessary to have some "forgetting" (i.e., $\lambda<1$). Simulations for this model have shown that a value of $\lambda=0.95$ achieves a good balance for the trade off of adapting to transients and rejecting noise. However, this value can be tuned to achieve desired performance of an engine. Furthermore, other adaptive laws can be implemented to calculate an adaptive correction factor based on $T_{ivc}$ or other estimated values.

By denoting the left sum of Equation (17) as a(n) and the right sum as b(n), it can be seen from induction that:

$$a(n) = \lambda a(n-1) + \phi(n)\phi(n)^T$$

$$b(n) = \lambda b(n-1) + \phi(n)z(n) \quad (18)$$

Since everything is scalar, $C_e(n) = b(n)/a(n)$ and the implementation can be achieved through the transfer functions:

$$a(n) = \left\{\frac{q}{q - \lambda}\right\} \phi^2(n) \quad (19)$$

and $$b(n) = \left\{\frac{q}{q - \lambda}\right\} \phi(n) z(n).$$

There are two conditions that should be avoided when implementing this model to calculate an adaptive scaling factor: a(n)=0 and a(n) or b(n) approaching infinity. Since a(n) is driven by $\phi^2$, it will stay positive provided it starts positive. Accordingly, neither a nor b can grow indefinitely given physically reasonable data. To avoid unphysical behavior however, the value of $C_e$ is restricted to be within a defined range (e.g., [0.75, 1.25]). The adaptive scaling factor is represented in this example as $C_e$ to denote the difference between the scaling factor calculated according to this example and the scaling factor as calculated according to a subsequent example below.

The discussion above provides (1) a mechanism for estimating a residual mass for a given combustion cycle based on the estimated residual mass for the previous combustion cycle and (2) an adaptive scaling factor. Because the calculation of the estimated residual mass is based on known information and converges over time, the mechanism described above allows the ECU 101 to accurately determine a value that greatly impacts HCCI combustion, but previously could not be determined in real-time. The adaptive scaling factor further adjusts the estimation to account for assumptions made in the calculation and also adapts to physical changes in the engine over time that affect combustion.

Figure 4:
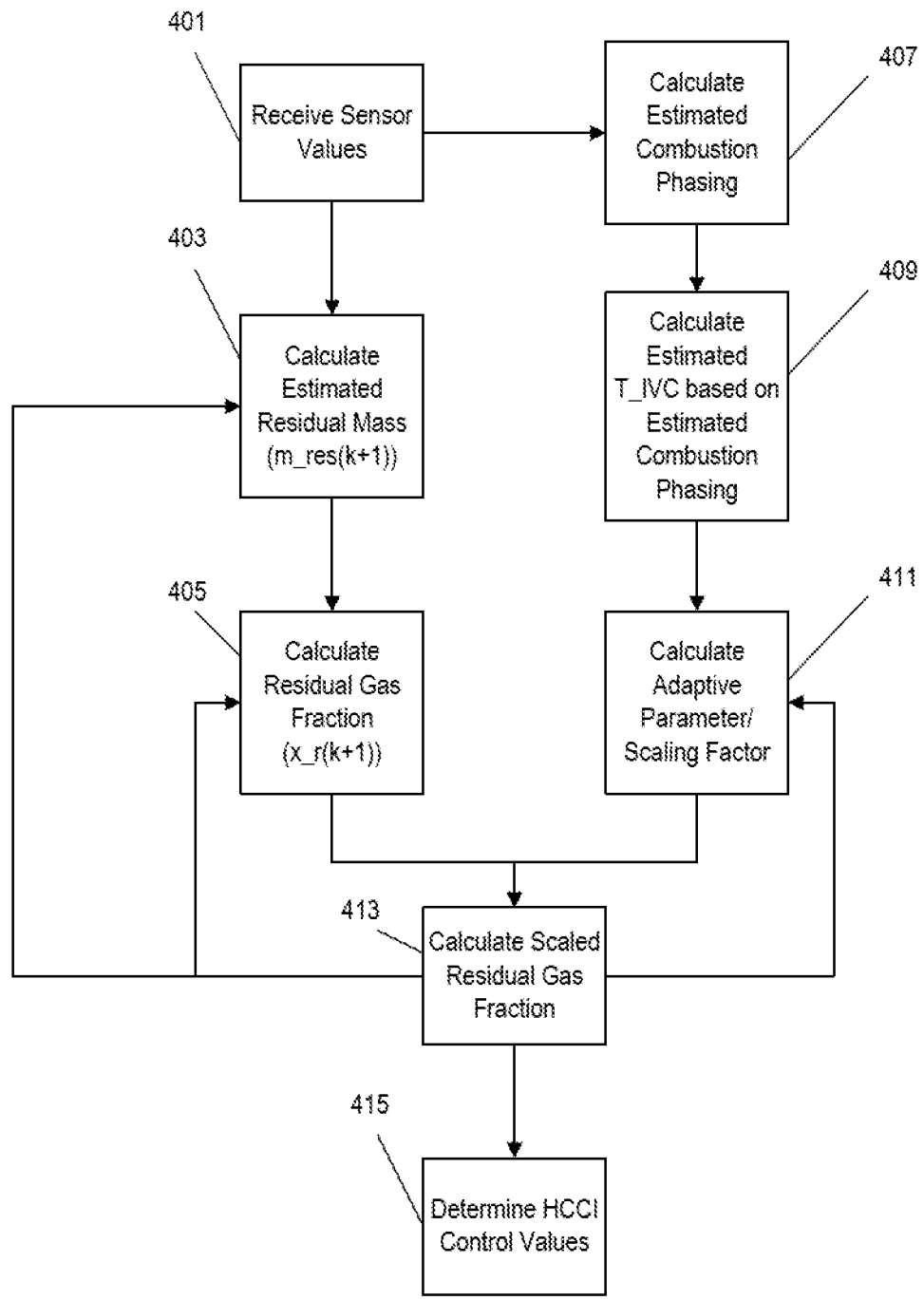
FIG. 4 is a flow-chart of a method of determining an estimated residual gas fraction based on an estimated residual mass for a previous combustion cycle and controlling HCCI combustion based on the estimated residual gas fraction.

FIG. 4 illustrates a method by which the ECU 101 calculates an estimated residual mass and a scaled residual gas fraction and uses these values to determine appropriate control values during HCCI combustion. The ECU 101 receives in-cylinder pressure values from pressure sensors 103 and receives temperature data from the temperature sensors 105 (step 401). Based on these measured values, other known values, and the estimated residual mass for the previous combustion cycle, the ECU 101 calculates an estimated residual mass based on Equation (9), above (step 403). The residual gas fraction $x_r$ is then determined according to equation (10) (step 405).

After calculating the residual gas fraction $x_r$ (or concurrently therewith), the ECU 101 calculates an estimated combustion phasing based on the measured in-cylinder pressure values (step 407). Using Equation (15), the ECU 101 calculates an estimated temperature of the cylinder contents at intake valve closing (i.e., $T_{ivc,e}$) (step 409). The estimated $T_{ivc,e}$ and the estimated residual gas fraction from the previous combustion cycle $x_r(k)$ (also represented as $\phi$) are then used to calculate the adaptive parameter scaling factor $\Theta$ based on Equations (17)-(19) (step 411).

After both the estimated residual gas fraction $x_r(k+1)$ and the adaptive scaling factor $C_e$ are calculated they are multiplied together to determine an adjusted estimated residual gas fraction $\hat{x}_r(k+1)$ (step 413). The adjusted estimated residual gas fraction $\hat{x}_r(k+1)$ and the estimated residual mass $m_{res}$ (k+1) are then used to determine appropriate fuel injection mass and fuel injection and valve timing for the next HCCI combustion cycle (step 415). These values are also stored to the memory of ECU 101 and are utilized to calculate the adaptive scaling factor $C_e$, the estimated residual mass $m_{res}$ (k+2), and the adjusted estimated residual gas fraction $\hat{x}_r(k+2)$ for the next combustion cycle (i.e., Cycle k+2).

Another method for determining the adaptive scaling factor $\Theta$ can be implemented by representing the error term as:

$$\epsilon(K-1) = \bar{x}_r(k-1) - \Theta(k-1)\hat{x}_r(k-1) \tag{20}$$

where $\bar{x}_r$ would ideally be the measured value of the residual gas fraction $x_r$. However, as noted above, it is difficult to accurately measure the residual gas fraction of an engine during online operation. Therefore, a measurement of the combustion phasing $\theta_{50}$ is used. The combustion phasing $\theta_{50}$ is calculated by the ECU 101 based on measurements from the in-cylinder pressure sensors and online heat release analysis.

As noted above, the combustion phasing model is approximated by the quadratic expression:

$$\bar{\theta}_{50}(k-1) = \alpha_{01}T_{ivc}^2(k-1) + \alpha_{02}T_{ivc}(k-1) + \alpha_{03} \tag{21}$$

where $\alpha_{01}$, $\alpha_{02}$, and $\alpha_{03}$, are functions of the injection timing of the engine. Through inversion of this model, the value of $T_{ivc}$, which is necessary for the measured combustion phasing of the previous cycle, is given by:

$$\bar{T}_{ivc}(k-1) = \frac{-\alpha_{\theta 2} - \sqrt{\alpha_{\theta 2}^2 - 4\alpha_{\theta 1}(\alpha_{\theta 3} - \bar{\theta}_{50}(k-1))}}{2\alpha_{\theta 1}} \tag{22}$$

The other solution to the quadratic is a non-physical solution. If we then employ a mass balance at intake valve closing as shown in:

$$\bar{T}_{ivc}(k-1) = \bar{x}_r(k-1)T_{res}(k-1) + (1 - \bar{x}_r(k-1))T_{im} \tag{23}$$

where $T_{im}$ is the measured intake manifold temperature and $T_{res}$ is approximated based on the model (see, eq. (11) above), then the value of $\bar{x}_r$ as approximated based on these temperature values is $$\bar{x}_r(k-1) = \frac{\bar{T}_{ivc}(k-1) - T_{im}}{T_{res}(k-1) - T_{im}} \tag{24}$$

The discrete gradient parameter estimation law is then used to determine the value of the adaptive scaling factor $\Theta$ for each combustion cycle according to the equation:

$$\Theta(k) = \frac{\kappa \bar{x}_r(k-1)\epsilon(k-1)}{\bar{x}_r(k-1)^2 + c_\Theta} + \Theta(k-1) \tag{25}$$

where $\kappa$ is a constant gain setting that controls the speed at which the algorithm converges. The gain can be tuned for a given system, but generally provides for a relatively slow convergence to prevent the adaptive controller from changing the transient response of the system.

Figure 5:
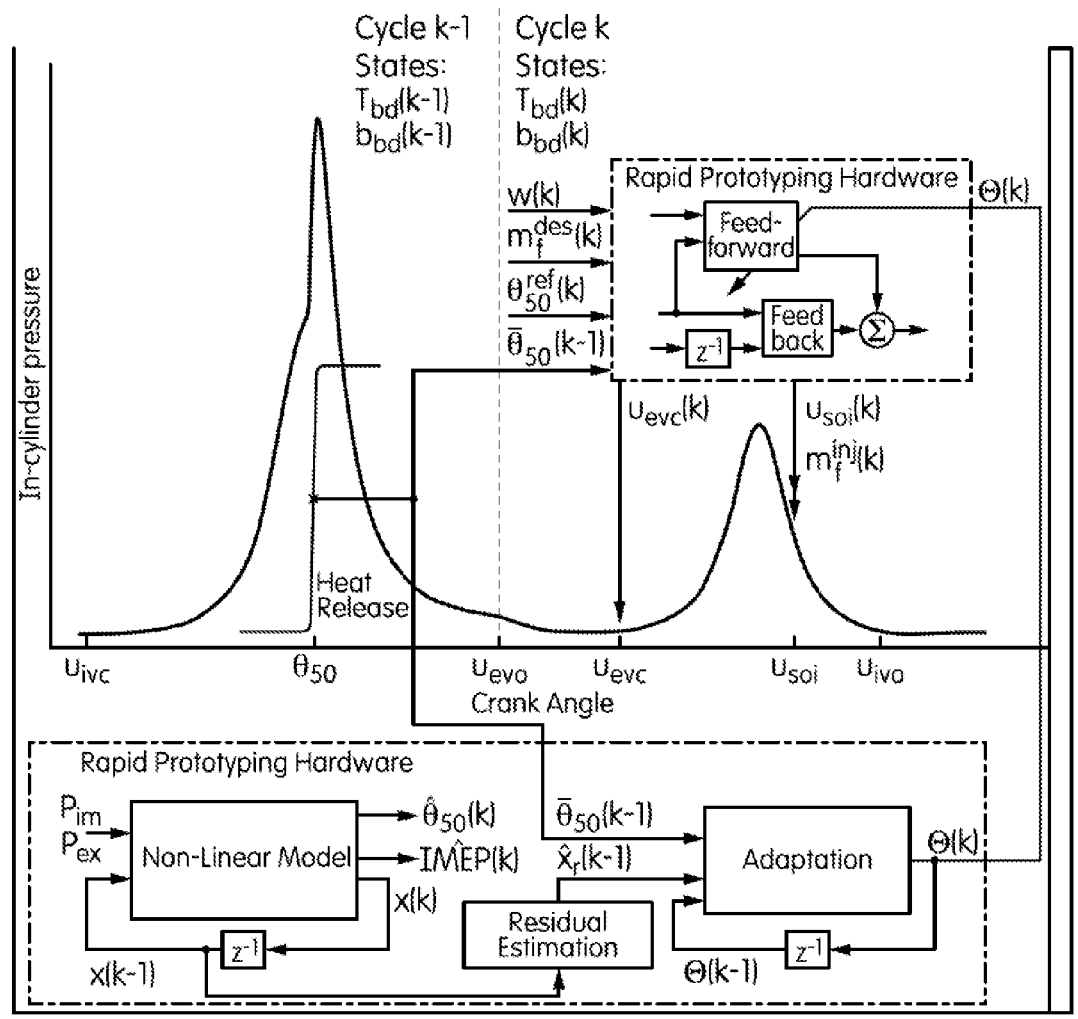
FIG. 5 is a schematic diagram of a control structure for implementing the method of FIG. 4.

FIG. 5 illustrates an example of control structure used to determine the estimated residual gas fraction $x_r$ and the adaptive scaling factor $\Theta$ according to equation (25). Measured cylinder pressures $P_{im}$ and $P_{ex}$ are provided as inputs to a non-linear model. As described above, the non-linear model is used to determine the combustion phasing $O_{50}$, the engine torque IMEP(k), and the residual gas fraction x(k) based on the estimated residual gas fraction for the previous combustion cycle x(k−1) (see, e.g., equation (9) above).

The combustion phasing for the previous combustion cycle $\theta_{50}(k-1)$ (as determined based on cylinder pressure measurements), the adjusted residual gas fraction for the previous combustion cycle $x_r(k-1)$, and the adaptable scaling factor for the previous combustion cycle $\Theta(k-1)$ are all provided to the adaptation module where they are used to calculate a new adaptive scaling factor for the current combustion cycle $\Theta(k)$ according to equation (25).

Thus, the invention provides, among other things, a systems and method for estimating the residual mass and the residual gas fraction for an engine during HCCI combustion. Various features and advantages of the invention are set forth in the following claims.

What is claimed is:

1. A method of estimating a residual mass in a cylinder after a combustion cycle, the method comprising:

determining an estimated residual mass for a first combustion cycle based on an estimated residual mass for a previous combustion cycle;

determining a value of a first performance variable for the first combustion cycle based only on engine data measured by one or more sensors;

estimating a value of a second performance variable for the first combustion cycle based at least in part on the estimated residual mass for the first combustion cycle;

determining an adaptive scaling factor for the first combustion cycle based on the determined value of the first performance variable for the first combustion cycle and the estimated value of the second performance variable for the first combustion cycle; and determining an adjusted residual mass for the first combustion cycle based on the estimated residual mass for the first combustion cycle and the adaptive scaling factor for the first combustion cycle.

2. The method of claim 1, wherein the first performance variable and the second performance variable are a single performance variable such that the value of the first performance variable is a determined value of the single performance variable based only on the engine data measured by one or more sensors and the value of the second performance variable is an estimated value of the single performance variable based at least in part on the estimated residual mass for the first combustion cycle.

3. The method of claim 2, wherein a difference between the value of the first performance variable and the value of the second performance variable is indicative of an error in the estimated residual mass, and wherein the adaptive scaling factor is determined based on the difference between the value of the first performance variable and the value of the second performance variable such that the adaptive scaling factor corrects the error in the estimated residual mass.

4. The method of claim 1, further comprising:

determining an estimated residual mass for a second combustion cycle based on the estimated residual mass for the first combustion cycle;

determining a value of the first performance variable for the second combustion cycle based only on engine data measured by the one or more sensors;

estimating a value of the second performance variable for the second combustion cycle based at least in part on the estimated residual mass for the second combustion cycle;

determining an adaptive scaling factor for the second combustion cycle based on the determined value of the first performance variable for the second combustion cycle and the estimated value of the second performance variable for the second combustion cycle; and determining an adjusted residual mass for the second combustion cycle based on the estimated residual mass for the second combustion cycle and the adaptive scaling factor for the second combustion cycle.

5. The method of claim 4, wherein the act of determining the adaptive scaling factor for the second combustion cycle further includes determining the adaptive scaling factor for the second combustion cycle based on the value of the first performance variable for the first combustion cycle and the value of the second performance variable for the first combustion cycle.

6. The method of claim 4, wherein the act of determining the adaptive scaling factor for the second combustion cycle further includes determining the adaptive scaling factor for the second combustion cycle based on the estimated residual mass for the second combustion cycle and the estimated residual mass for the first combustion cycle.

7. The method of claim 4, wherein the act of determining the adaptive scaling factor for the second combustion cycle includes determining the adaptive scaling factor according to the equation:

$$C_e(n) = \left(\sum_{i=1}^{n} \phi(i)\lambda^{(n-i)}\phi(i)^T\right)^{-1}\left(\sum_{i=1}^{n} \phi(i)\lambda^{(n-1)}z(i)\right)$$

wherein n is an index for the second combustion cycle, n−1 is an index for the first combustion cycle, $C_e(n)$ is the adaptive scaling factor for the second combustion cycle, $\phi(i)$ is a value indicative of the estimated residual mass for combustion cycle i, z(i) is a value indicative of the value of the first performance variable and the second performance variable for combustion cycle i, and $\lambda$ is a tuning parameter whose value affects a weight given to previous combustion cycles in calculating the adaptive scaling factor for the second combustion cycle.

8. The method of claim 7, wherein the first performance variable includes a temperature of the cylinder when an intake valve is closed during a combustion cycle, wherein the second performance variable includes a temperature of the cylinder at an end of the combustion cycle, and wherein z(i) is calculated according to the equation:

$$z(i)=(T_{ivc}(i)-T_{im}(i))/(T_{res}(i)-T_{im}(i))$$

wherein $T_{ivc}(i)$ is the value of the first performance variable during combustion cycle i, $T_{res}(i)$ is the value of the second performance variable during combustion cycle i, and $T_{im}(i)$ is a temperature of intake air drawn into the cylinder during combustion cycle i as measured by a temperature sensor.

9. The method of claim 4, wherein the act of determining the adaptive scaling factor for the second combustion cycle includes determining the adaptive scaling factor according to the equation:

$$\Theta(k) = \frac{\kappa \bar{x}_r(k-1)\epsilon(k-1)}{\bar{x}_r(k-1)^2 + c_\Theta} + \Theta(k-1)$$

where $\kappa$ is a tunable gain constant, $\Theta(k)$ is the adaptive scaling factor for the second combustion cycle, $\Theta(k-1)$ is the adaptive scaling factor for the first combustion cycle, $c_\Theta$ is an experimentally defined constant, $\bar{x}_r(k-1)$ is a calculated value of the residual gas fraction for the first combustion cycle based at least in part on a combustion phasing determined based on measured cylinder pressure values, and $\epsilon(k-1)$ is an error factor indicative of an error between measured values and estimated values for the first combustion cycle.

10. The method of claim 9, wherein the calculated residual gas fraction for the first combustion cycle is determined based on the equation:

$$\bar{x}_r(k-1) = \frac{\bar{T}_{ivc}(k-1) - T_{im}}{T_{res}(k-1) - T_{im}}$$

where $T_{res}(k-1)$ a temperature of the residual mass for the first combustion cycle and is calculated based on the adjusted residual mass for the first combustion cycle, $T_{im}$ is a temperature of air measured at the intake manifold by a temperature sensor, and $T_{ivc}(k-1)$ is a temperature of the cylinder at intake valve closing calculated based on observed combustion phasing for the first combustion cycle.

11. The method of claim 10, wherein $T_{ivc}(k-1)$ is determined based on the equation:

$$\overline{T}_{ivc}(k-1) = \frac{-\alpha_{\theta 2} - \sqrt{\alpha_{\theta 2}^2 - 4\alpha_{\theta 1}(\alpha_{\theta 3} - \overline{\theta}_{50}(k-1))}}{2\alpha_{\theta 1}}$$

where $\alpha_{01}$, $\alpha_{02}$, and $\alpha_{03}$, are functions of fuel injection timing and $\theta_{50}$ is the combustion phasing for the first combustion cycle, and wherein $O_{50}$ is determined based on measured cylinder pressures during the first combustion cycle.

12. The method of claim 9, wherein the error factor is determined according to the equation $$\epsilon(k-1) = \overline{x}_r(k-1) - \Theta(k-1)\hat{x}_r(k-1)$$

where $\hat{x}_r(k-1)$ is an adjusted value of the residual gas fraction for the first combustion cycle determined based on the estimated residual mass for the first combustion cycle and the adaptive scaling factor for the first combustion cycle.

13. The method of claim 4, wherein the estimated residual mass for a second combustion cycle is calculated according to the equation:

$$m_{res}(k+1) = \frac{\alpha(k) + \beta(k)m_{res}(k)}{A(k) + m_{res}(k)}$$

wherein $m_{res}(k+1)$ is the estimated residual mass for the second combustion cycle, $m_{res}(k)$ is the estimated residual mass for the first combustion cycle, and $\alpha(k)$, $\beta(k)$, and $A(k)$ are functions of at least one of the group consisting of known engine control inputs, values measured by sensors, and constants indicative of a type of fuel.

14. A method of controlling homogeneous charge compression ignition (HCCI) combustion in an engine, the method comprising:
determining the adjusted residual mass for the first combustion cycle and the adjusted residual mass for the second combustion cycle according to the method of claim 4;
adjusting, by an engine control unit, a control variable during the second combustion cycle based on the adjusted residual mass for the first combustion cycle, wherein the control variable includes at least one variable selected from the group consisting of timing of intake valve opening, timing of intake valve closing, timing of exhaust valve opening, timing of exhaust valve closing, timing of fuel injection, and mass of fuel injected; and
adjusting, by the engine control unit, the control variable during a third combustion cycle based on the adjusted residual mass for the second combustion cycle, wherein the second combustion cycle occurs prior to the third combustion cycle and subsequent to the first combustion cycle.

15. The method of claim 1, further comprising repeating the act of determining an estimated residual mass for each combustion cycle based on an estimated residual mass for the immediately preceding combustion cycle.

16. The method of claim 15, wherein the act of determining an estimated residual mass for each combustion cycle includes determining the estimated residual mass for each combustion cycle according to a function defined such that the estimated residual mass for each subsequent combustion cycle converges towards a more accurate value of the estimated residual mass.

17. The method of claim 1, further comprising:
determining an estimated residual gas fraction for the first combustion cycle based on the estimated residual mass for the first combustion cycle; and
determining an adjusted residual gas fraction based on the estimated residual gas fraction for the first combustion cycle and the adaptive scaling factor for the first combustion cycle.

18. The method of claim 1, wherein the act of determining an adjusted residual mass includes multiplying the estimated residual mass for the first combustion cycle by the adaptive scaling factor for the first combustion cycle.

19. The method of claim 1, wherein the act of determining an adjusted residual mass for the first combustion cycle is performed on-line by an engine control unit such that the adjusted residual mass for the first combustion cycle can be used by the engine control unit to control operation of the engine during a subsequent combustion cycle.

20. A method of controlling homogeneous charge compression ignition in an engine, the method comprising:
determining an estimated residual mass for a combustion cycle based on measured engine parameters and an estimated residual mass for a previous combustion cycle, the estimated residual mass including an estimated amount of fuel remaining in an engine cylinder at an end of the combustion cycle;
determining a first temperature value for the cylinder based only on a calculated combustion phasing for the combustion cycle, wherein the calculated combustion phasing is based on cylinder pressure data directly measured during the combustion cycle;
estimating a second temperature value for the cylinder based on the estimated residual mass for the combustion cycle;
determining an adaptive scaling factor based at least in part on a discrepancy between the first temperature value and the second temperature value, wherein the adaptive scaling factor is indicative of an error of the estimated residual mass for the combustion cycle;
determining an estimated residual gas fraction based on the estimated residual mass;
determining an adjusted residual gas fraction by multiplying the estimated residual gas fraction by the adaptive scaling factor; and
controlling at least one engine control variable during a subsequent combustion cycle based on the adjusted residual gas fraction, wherein the at least one engine control variable includes at least one engine control variable selected from the group consisting of timing of intake valve opening, timing of intake valve closing, timing of exhaust valve opening, timing of exhaust valve closing, timing of fuel injection, and mass of fuel injected.

* * * * *